(No Model.)
J. P. ANDERSEN.
MAGAZINE CAMERA.
No. 565,712. Patented Aug. 11, 1896.
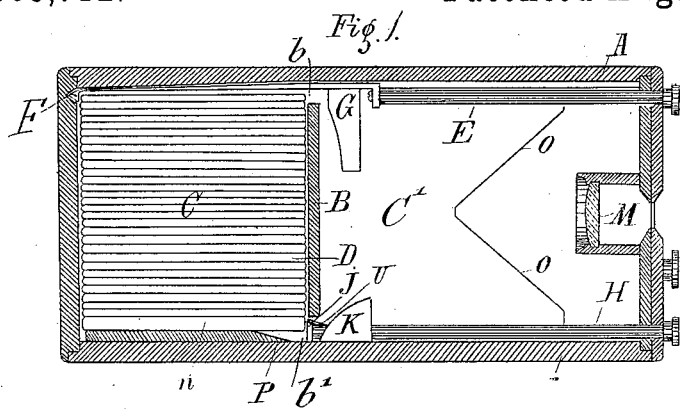
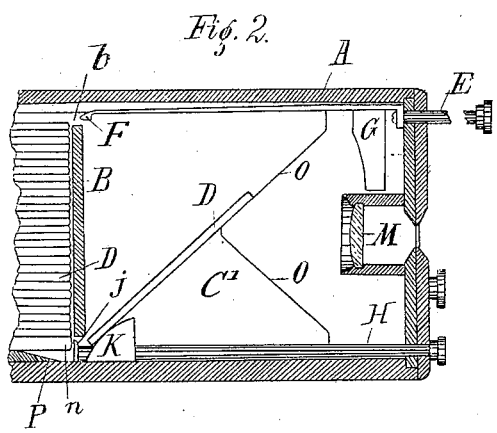
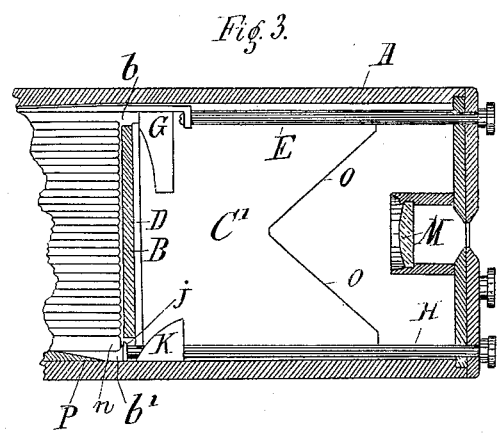
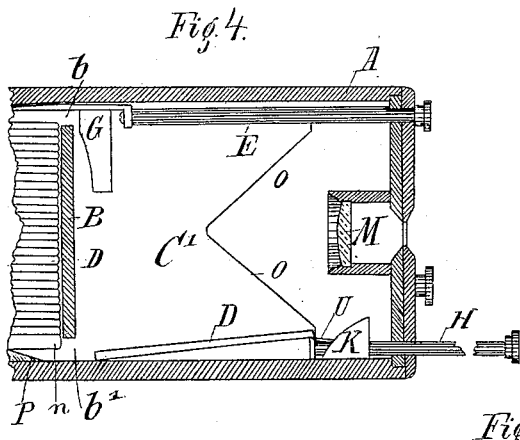
WITNESSES:
Geo. W. Jackel
R. J. Pelouze
INVENTOR
Jens Poul Andersen
BY
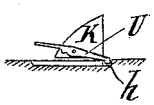
ATTORNEYS.

UNITED STATES PATENT OFFICE.

JENS POUL ANDERSEN, OF NELLEROD, DENMARK, ASSIGNOR TO BERTHEL GEORG PAGH MÖLLER, OF KOLDING, DENMARK.

MAGAZINE-CAMERA.

SPECIFICATION forming part of Letters Patent No. 565,712, dated August 11, 1896.

Application filed January 10, 1896. Serial No. 574,927. (No model.)

*To all whom it may concern:*

Be it known that I, JENS POUL ANDERSEN, manufacturer, of Nellerod, Denmark, a citizen of the Kingdom of Denmark, have invented certain new and useful Improvements in Photographic Apparatuses, of which the following is a specification.

This invention relates to a photographic apparatus having a magazine in which a large number of plates are stored, which plates may, through the medium of mechanical manipulation from the outside of the apparatus, be extracted from the magazine one after the other and exposed and afterward pushed into the same magazine from which they were originally extracted.

My invention consists of a photographic apparatus comprising a casing provided with a magazine at one end and a lens at the other end, two movable rods guided in the casing and provided with suitable projections for engaging the plates, and suitable guides on the side walls of the casing of the camera, the same being arranged in such a manner that the uppermost plate in the magazine of the camera may, by means of one rod, be pulled into the front compartment of the camera and by means of the projections on the rods be placed in position for exposure, after which the plate is, by means of the other rod, pushed back into the magazine which it originally occupied, but instead of being pushed onto the top it is pushed below the pile of plates in the magazine.

My invention also consists of certain other features of construction and combination of parts to be fully described hereinafter, and then particularly pointed out in the claims.

In the accompanying drawings, Figures 1, 2, 3, and 4 are vertical longitudinal sections of the camera, showing the mechanism for transferring the plates and holding them exposed in four different positions. Fig. 5 is a horizontal longitudinal section of the camera; and Fig. 6 is a detail view of the inner end of the push-rod, showing the pawl pivoted thereto, whereby the push-rod is held in inner position.

Similar letters of reference indicate corresponding parts.

The apparatus consists of a casing or box A, which is divided into front and rear compartments C C′ by means of a transverse partition B. The compartment C, at the rear of the camera and farthest away from the lens M, forms the magazine for the pile of plates D. Each of the plates D is preferably provided with a metallic frame which is open at that side at which the plate has to be exposed.

Before the pile of unexposed plates D is placed in the magazine a follower or dividing-plate $n$ is arranged at the bottom of the magazine, so as to be at the bottom of the pile. The purpose of this plate will shortly be described. Gradually, as the plates are desired, the uppermost plate of the pile is conveyed into the exposing-compartment of the camera, where it is exposed and then conveyed back into the magazine, but will occupy the lowest position in the pile. The dividing-plate $n$ will in this way form a partition between the plates that have been exposed and those that have not yet been exposed.

The devices for manipulating the plates will now be described.

The top part of the camera is provided with a longitudinally-guided pull-rod E, on which are arranged projections F and G. The projection F is in the form of a hook or nose at the inner end of the pull-rod, while the projection G is larger and is arranged in the exposing-compartment C′ of the camera. The terminal hook F of the pull-rod E is beveled, so that the pull-rod can be pushed backwardly over the pile of plates without disturbing the same, but so that the perpendicular face of the hook will engage the rear edge of the uppermost plate of the pile in the magazine, as shown in Fig. 1. By pulling the pull-rod E the hook F will draw the top plate of the pile forward through the top opening $b$, causing the same to fall down into the exposing-compartment of the camera and rest upon the projecting side supports or guides $o$, that are fixed to the side walls of the camera, and upon the projections K on the push-rod H, which is guided longitudinally in the bottom part of the camera. (See Fig. 2.) Now when the pull-rod E is pushed in again, the downwardly-extending projections G thereof, which are arranged similarly to the projections K on the push-rod H, as shown in Fig.

5, will raise the plate into vertical position and support the same against the front of the partition B, where it is kept in firm position for exposure by means of the downward projections G at the top and the upward projections K at the bottom. (See Fig. 3.) When the plate is in this position, it will rest on a pawl $u$, which is pivoted to the cross-bar H' of the push-rod H, (shown in Figs. 5 and 6,) and by reason of its weight depress the pawl in such a way that the operative end of the pawl is released from a notch $h$ in the bottom of the camera, so that the rod H may be pulled out. The rod H is pulled out at the moment that the exposure of the plate has been completed. At the inner end of the rod H is a projection $j$, which, by engaging with the lower edge of the plate, carries the plate forward, so that after the rod H has been nearly pulled out the plate will occupy the inclined position shown in Fig. 4, with the exposed side uppermost. If the rod H is now pulled out still farther, the plate supported on the projection $j$ will fall down in front of the latter, so that when the push-rod H is pushed in again the plate will be conveyed back into the magazine. In pushing the exposed plate back into the magazine it slides backwardly through the opening $b'$ and under the pile of plates upon an incline P, arranged at the bottom of the magazine. All of the plates may now be exposed and manipulated in the same manner until the dividing-plate $n$ arrives at the top of the pile. All of the plates which have thus been exposed are now taken out, conveyed into a dark chamber, and replaced by a pile of new plates. When the dividing-plate $n$ arrives at the top of the pile of exposed plates, the working of the camera is stopped, as said dividing-plate $n$ has double the thickness of the sensitive plates and cannot therefore be pulled forward through the top opening $b$ above the partition B.

Having thus described my invention, I claim as new and desire to secure by Letters Patent—

1. A photographic apparatus, consisting of a casing provided with an aperture and an objective lens, a partition dividing the casing into a magazine and an exposing-compartment, means for removing the plates from the pile, holding the same in exposed position and returning the same into the magazine, and slanting guides $o$ arranged in contact with the inner sides of the casing, substantially as set forth.

2. A photographic apparatus, consisting of a camera provided with a push-rod, and a pawl pivoted to the push-rod, said pawl being adapted to engage in a notch in the bottom of the casing of the camera, substantially as set forth.

In testimony that I claim the foregoing as my invention I have signed my name in presence of two subscribing witnesses.

JENS POUL ANDERSEN.

Witnesses:
L. J. COFMAN-BANG,
G. OLSEN HAUGE.